Figure 1:
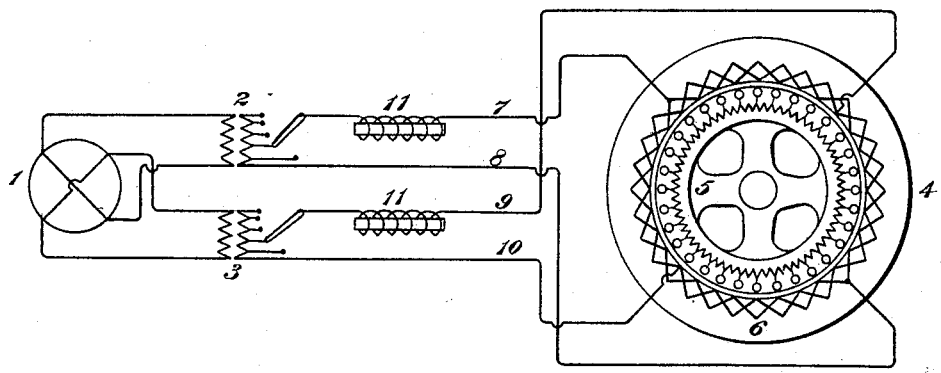

No. 609,991. Patented Aug. 30, 1898.
B. G. LAMME.
METHOD OF AND MEANS FOR SECURING CONSTANT TORQUE IN POLYPHASE MOTORS.
(Application filed Feb. 10, 1898.)
(No Model.)

WITNESSES:

INVENTOR
Benjamin G. Lamme
BY
Wesley G. Carr
ATTORNEY.

UNITED STATES PATENT OFFICE.

BENJAMIN G. LAMME, OF PITTSBURG, PENNSYLVANIA, ASSIGNOR TO THE WESTINGHOUSE ELECTRIC AND MANUFACTURING COMPANY, OF PENNSYLVANIA.

METHOD OF AND MEANS FOR SECURING CONSTANT TORQUE IN POLYPHASE MOTORS.

SPECIFICATION forming part of Letters Patent No. 609,991, dated August 30, 1898.

Application filed February 10, 1898. Serial No. 669,848. (No model.)

*To all whom it may concern:*

Be it known that I, BENJAMIN G. LAMME, a citizen of the United States, residing in Pittsburg, in the county of Allegheny and State of Pennsylvania, have invented a new and useful Improvement in Methods of and Means for Securing Constant Torque in Polyphase Motors, (Case No. 768,) of which the following is a specification.

My invention relates to alternating-current electric motors having rotary magnetic fields produced by currents which differ in phase.

It has for its object to provide a method and means whereby such motors may be efficiently operated at different speeds without any substantial variation in torque.

In a prior application filed by me March 11, 1896, Serial No. 582,765, I have set forth a method of and means for operating motors of the class above designated at different speeds, but in which the torque decreases as the speed increases, the maximum torque being secured at zero speed. It is set forth in my said application that in order to secure such maximum torque at zero speed and to vary the speed at will over a considerable range it is necessary that the secondary member of the motor have a comparatively high resistance winding and that the magnetic leakage between the primary and secondary members shall be small.

In practicing my present invention it is to be understood that the motor which is to exert a substantially constant torque shall have a comparatively high resistance secondary winding, and that the size, shape, and number of the core-slots shall be such that the magnetic field around and through them, due to the ampere-turns per slot, shall be small as compared with the total magnetic field through the primary and secondary, and also that the end portions of the winding shall be so arranged that their local magnetic fields shall be relatively small.

It has been proposed to secure constant torque in this class of motors by employing a secondary resistance and providing automatic means which shall vary the amount of resistance in the secondary circuit as the speed of the motor varies. Such a method involves the use of more or less complicated apparatus having relatively-moving parts which are liable to get out of order, and for that reason and to that extent it is objectionable.

If it were possible to construct a motor having a magnetic leakage which would increase with an increase of current up to a certain point and which would have a much lower rate of increase beyond that point, it would be possible to secure a substantially constant torque for different speeds up to the point where the change in the rate of increase in the leakage occurs. This condition, however, cannot be readily obtained by any construction in the motor itself. I have found, however, that it may be obtained by employing choke-coils in the external circuits. If each choke-coil is so proportioned that its iron core or magnetic circuit saturates at some given quantity of current, the electromotive force may rise to a certain value with the current and then remain almost constant, or increase but slowly with increase of current. If circuits corresponding to the several phases of current supplying the motor be provided with choke-coils and the point of saturation be made to correspond substantially to the point of maximum torque, the self-induction of the motor-circuits beyond this point will not increase as rapidly as before, and by properly proportioning the choke-coils a torque which is practically constant may be obtained.

Figure 2:
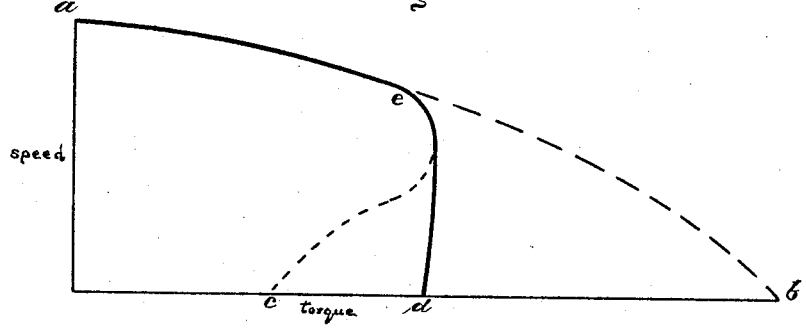

In the accompanying drawings, Figure 1 is a diagram of a two-phase motor, a two-phase generator, and means operated in accordance with my invention for securing variable speed and constant torque in the motor. Fig. 2 is a diagram of speed and torque curves.

1 is a two-phase generator supplying the primaries of two stationary transformers 2 and 3, the secondaries of these transformers being shown as provided with means for varying their active lengths in order to secure different electromotive forces, such means being well known in the art.

4 is a two-phase motor, the secondary member 5 of which is shown as having comparatively high resistance circuits closed upon themselves. The winding 6 of the primary member is connected at appropriate points to the circuits 7 8 and 9 10, supplied by the secondaries of the transformers 2 and 3. In each of these circuits 7 8 and 9 10 is a choke-coil 11, so designed that its core will become saturated for a given quantity of current, the point at which saturation will occur being readily determined in accordance with the conditions which it is desired to meet or fulfil in any particular case.

If the motor and organization of circuits represented in Fig. 1, but without the choke-coils 11, be employed, the curve representing the torque in terms of speed will be indicated by the curved line $a\,b$, from which it will appear that a maximum torque is secured at zero speed and that it gradually decreases with the speed. If the motor have a very low secondary resistance and a comparatively large magnetic leakage, the torque-curve would be represented by the line $a\,c$.

If it were feasible to so construct the motor that its magnetic leakage would increase as the current increases to a given point and at a much lower rate beyond that point, a speed-torque curve represented by the line $a\,d$ could be secured. It being impracticable, however, as I have already stated, to make this provision in the construction of the motor itself, I propose to employ motors having a comparatively high resistance secondary winding and a low degree of magnetic leakage which would have speed-torque curves represented by line $a\,b$, if operated independently of my present invention. When the choke-coils 11 are employed in connection with a motor like that last described, the speed-torque curve will be that represented by the line $a\,d$, from which it will be seen that the torque will remain practically constant from zero speed to that represented by the point $e$, this point representing that at which saturation of the core of the choke-coil takes place. It will thus be seen that a practically constant torque is secured over a considerable range of speed.

I claim as my invention—

1. The combination with an induction alternating-current motor having a comparatively high resistance secondary winding and a low degree of magnetic leakage, of a reactive coil in each of the supply-circuits the core of which becomes saturated by a predetermined amount of current whereby a substantially constant torque is secured.

2. The combination with an induction polyphase motor having a comparatively high resistance secondary winding and small magnetic leakage, of choke-coils in the external circuit the cores of which become saturated by a given current whereby a substantially constant torque is secured.

3. The method of securing constant torque in an induction alternating-current motor which consists in supplying the actuating-currents through choke-coils the magnetic circuits of which become saturated at a predetermined point in the increase of the quantity of current.

4. The method of producing and maintaining constant torque in alternating-current motors having rotary fields produced by out-of-phase currents, which consists in subjecting such out-of-phase currents to self-induced counter electromotive forces which vary with the current up to a given point, and which vary at a materially different rate beyond that point.

In testimony whereof I have hereunto subscribed my name this 8th day of February, A. D. 1898.

BENJ. G. LAMME.

Witnesses:
WESLEY G. CARR,
H. C. TENER.